Feb. 24, 1959 W. F. FITZGERALD 2,874,510
FISHING DEVICE
Filed Feb. 6, 1958

William F. Fitzgerald
INVENTOR.

BY Clarence A. O'Brien
and Harvey B. Jacobson
Attorneys

United States Patent Office 2,874,510
Patented Feb. 24, 1959

2,874,510
FISHING DEVICE
William F. Fitzgerald, Dallas, Tex.
Application February 6, 1958, Serial No. 713,704
1 Claim. (Cl. 43—44.81)

The present invention pertains to a simple and expedient device which is effectually constructed and designed to enable the user thereof to fish in waters known to contain brush, tree limbs and debris and which diminishes the likelihood of the barbed hooks, with which it is provided, catching or hanging on the debris, generally speaking.

Briefly, the invention in a preferred embodiment thereof is characterized by a lead or equivalent weight bell-shaped in general configuration and equipped at its lower portion with radial circumferentially spaced barbed hooks and having an eye at its upper end to which a leader is attached, the leader, in turn being provided at its upper end with a swivel.

More specifically, the hooks are substantially conventional and have the eye-equipped ends of their shanks embedded in the lower portion of the lead weight so that the shank is at a slight angle of approximately 20° slanting downward from the bottom of the weight. The upper end of the weight has a brass wire embedded in the lead and fashioned into a ring or eye to which the lower end of the leader, of proper length, is connected.

Other objects, features and advantages will become apparent from the drawing.

Figure 1:
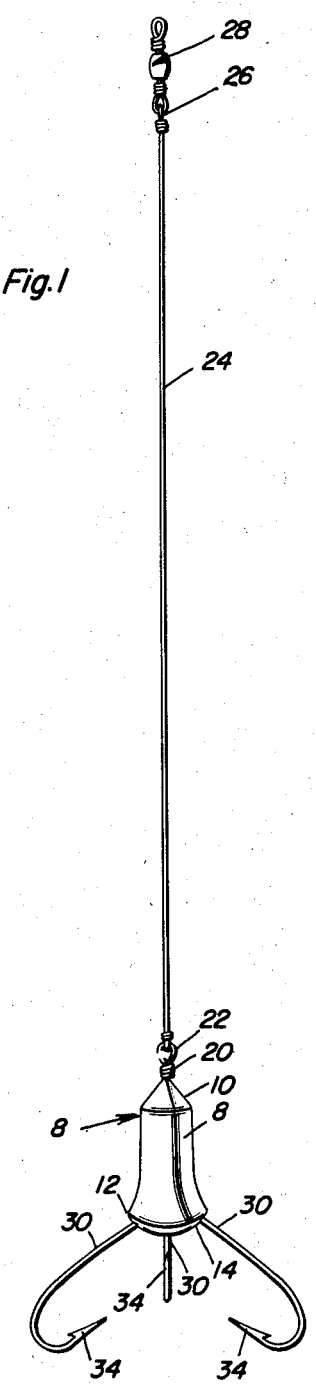
Fig. 1 is a perspective view of a fishing device embodying the improvements.
Figure 3:
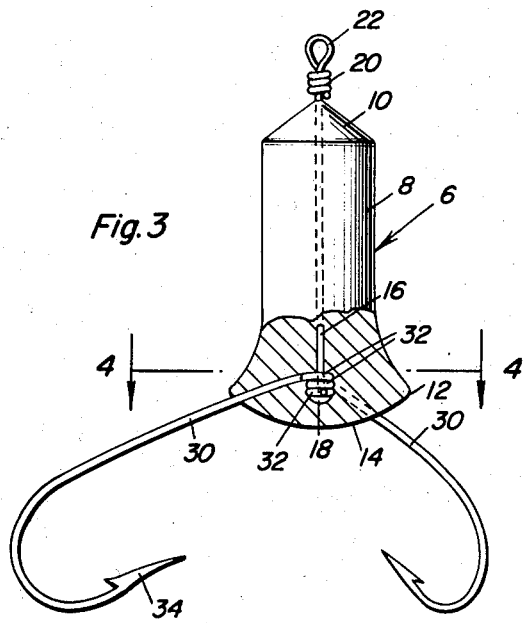
Fig. 3 is a view with parts appearing on a larger scale and with the lower portion of the lead weight broken away to clarify the showing of parts.
Figure 4:
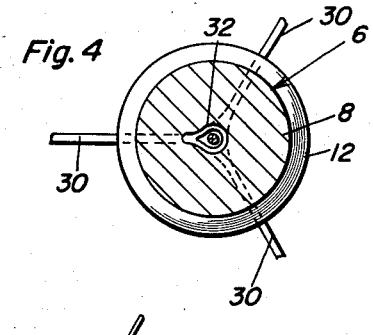
Fig. 4 is a cross-section on the line 4—4 of Fig. 3.
Figure 2:
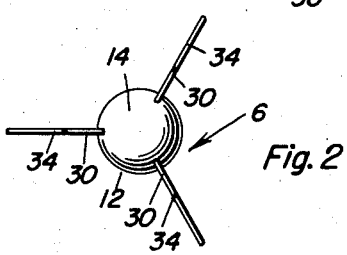
Fig. 2 is a bottom plan view.

Referring now to the drawing the aforementioned lead weight or sinker is denoted by the numeral 6 and is of bell-shape in general configuration. More particularly the body portion is cylindrical and is denoted at 8 and the upper end is conical at 10. The lower end flares outwardly into general bell-shaped formation at 12 and the bottom is convex at 14. There is a brass rod or wire 16 embedded axially in the lead weight with the headed lower end 18 terminating above the center of the convex surface. The upper end of the wire is twisted at 20 where it projects beyond the apex of the cone and is fashioned into an eye 22 to which the lower end of a suitable leader 24 is connected. The upper end 26 of the leader is in turn connected with a swivel 28. There are three conventional type fishhooks and these are disposed in a group or cluster arrangement and the hooks are substantially identical. The shank portions 30 have their upper eye-equipped ends 32 embracing the headed lower end of the brass rod 16 where they are thus linked to said lower end. The median portions project radially beyond the lower portion of the weight at the approximate juncture of the flared peripheral edge 12 and convex bottom 14. The return bends carry the customary barbed hooks 34 and these hooks are disposed in equidistant circumferentially spaced relationship in a suitable plane relative to the convex bottom 14.

This hook is especially attractive to crappie when baited with a minnow on each hook, the swivel allowing the minnows freedom of motion, keeping the hooks turning about, forming a live lure for crappie, which bite by sight. This hook is especially designed for crappie and brush fishing, however can be used for any type fishing where three hooks are permitted by law. The hooks, as such, not being the subject matter of this patent application, may be of any convenient design or manufacture and of any proper material and size, when manufactured for use for crappie to be any standard manufacture 3–0 black hook, using a size 18 brass wire with 20 lb. test leader and swivel of appropriate size and strength.

The invention features, as is evident, hooks which are so placed in the lead weight as to cause the hooks, as a group, to be counterbalanced and so that when the device is either lowered or raised through brush and other obstructions in the water the hooks are at no time under pressure directly against the object. Also, the swivel connection between the leader and line (not shown) enables the over-all device to turn freely thus permitting the hooks to spin under certain circumstances and to provide an attractive moving target.

In practice the eye-equipped ends of the hooks are fastened and fixed to the lower headed end of the brass rod thus providing a skeleton which is easily embedded in the molded lead or equivalent weight.

While the invention has been described with respect to a practical single embodiment thereof it should be understood that it is desired to accord the same a scope embracing all reasonable variations which are encompassed by the invention as claimed.

What is claimed as new is as follows:

An anti-fouling fishing device comprising an approximately bell-like weight having an elongated cylindrical body portion, an upper tapered conical end portion and an outwardly enlarged and flaring bottom portion with a convex bottom side, a plurality of circumferentially spaced fishhooks each having a shank with a hook on the outer end of the shank, the inner ends of the shanks having eyes embedded in the lower portion of said weight, and a rod embedded axially in said weight and having a headed lower end to which the inner eye-equipped ends of the shanks are severally connected, the upper portion of said rod extending above the upper end of the weight and terminating in an eye which is adapted to accommodate the lower end portion of a leader.

References Cited in the file of this patent
UNITED STATES PATENTS
2,210,271     Thwaits _____ Aug. 6, 1940